Sept. 18, 1962 R. MORGAN 3,054,918
GASEOUS ELECTRON TUBE
Filed Dec. 29, 1959

INVENTOR:
RAYMOND MORGAN
BY
Howson & Howson
ATTYS

United States Patent Office 3,054,918
Patented Sept. 18, 1962

3,054,918
GASEOUS ELECTRON TUBE
Raymond Morgan, Highland, Md.
Filed Dec. 29, 1959, Ser. No. 862,506
3 Claims. (Cl. 313—93)

This invention relates to a gaseous electron tube and particularly to tubes of the type used for detection and measurement of radiation and particle emission, such as tubes of the Geiger-Müller type.

Tubes of these types ordinarily comprise two metal electrodes, usually a cylindrical metal cathode surrounding a wire anode. These electrodes are within an envelope which encloses gases usually at somewhat less than atmospheric pressure. Commonly employed are a mixture of one or more inert gases and one gas from the halogen group. The gas from the halogen group serves as a quenching agent.

The quenching agent serves to favorably modify the discharge process and simplifies the electronic mechanism for the detection of the counts. In early "self-quenching" Geiger counters a polyorganic vapor was used as the quenching agent. These vapors were found to crack or be consumed in the course of the tube's life, however, resulting in pressure changes and a corresponding change in tube operational characteristics. Often in gas filled tubes a change in gas pressure will adversely affect operation or change operational characteristics of the tube.

Substitution of pure halogen gas, such as bromine, chlorine and iodine, made considerable improvement, but halogen gases will react to some extent with all metals, thereby changing the tube characteristics over a period of time. Many devices have been tried to eliminate or decelerate this effect. Perhaps the greatest success to date has been experienced in using electrodes of oxides or having oxide coatings as taught in my copending application, Serial No. 666,831, filed June 20, 1957, now U.S. Patent No. 2,925,510. While this solution has proven most satisfactory on a laboratory and small batch basis, it may involve some processing and other problems in large scale production, and consequently other solutions have been sought that are more direct and less expensive.

The present invention is intended to overcome the difficulties in testing the coatings of electrodes by making it unnecessary to coat the electrodes or unnecessary for the coating, if used, to be perfect. In accordance with the method of the present invention, titanium tetrachloride is substituted for the pure halogen gas as a quenching agent.

Titanium tetrachloride is a highly stable substance which has little or no tendency to react with many metals. It is usually a liquid at normal room temperatures and atmospheric pressure but becomes a gas at room temperature and lowers temperatures under reduced pressure.

The present invention contemplates the use of titanium tetrachloride as the quenching agent in an electron tube of the Geiger-Müller type employing electrodes of any type. However, for extremely stable operating conditions, electrodes of titanium or electrodes of titanium oxides may be employed.

For a better understanding of the present invention, reference is made to the following drawings, in which FIG. 1 is a partial sectional view with the section taken along the axis of a typical Geiger-Müller counter;

Figure 1:
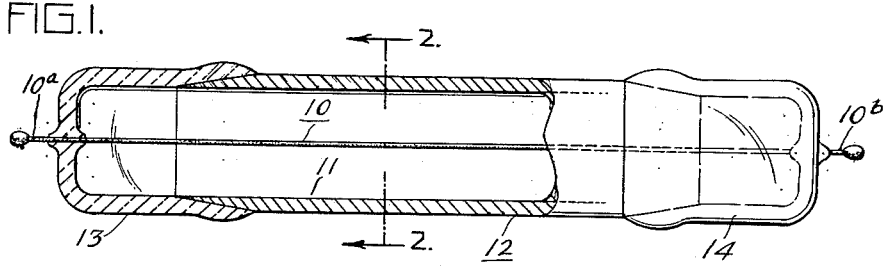
Figure 2:
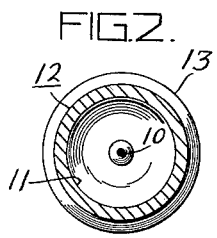
FIG. 2 is a sectional view taken along line 2—2 of FIG. 1.

Referring to FIGS. 1 and 2, a Geiger counter having a cathode 11 and an anode 10 is shown. The anode is composed of a wire of titanium or some other material extending axially through a cylindrical tube 12. The cathode is provided by the inner tubular surface 11 of the tube 12. Sealed to the opposite ends of tube 12 are glass caps 13 and 14 through the ends of which is sealed the anode 10. As will be seen, the electrical connections can be made at terminals 10a or 10b of the anode and at the outer surface of cathode 12.

Each of the electrodes is preferably composed of titanium metal, for reasons which will appear. Within the envelope are placed the inert gas, such as argon, zenon or neon and the quenching agent. The quenching agent is composed of titanium tetrachloride. These gases are present in approximately conventional proportions for the noble gases and quenching agent in accordance with the desired characteristics.

Titanium tetrachloride for a counter has proven to be highly stable and there is little or no tendency for it to react with the electrodes or otherwise to be used up as in the case of the halogen gases or as in the case of organic vapors previously used as quenching agents.

Breakdown of titanium tetrachloride occurs in a reaction described in a book on titanium by Drs. A. D. McQuillan and M. K. McQuillan at page 11 as follows:

$$TiCl_4 \rightarrow Ti + 2Cl_2$$

The necessary temperature for this reaction is so high, however, that in practice it would be unobtainable under the conditions of Geiger counter uses. Alternatively, there is a thermodynamic possibility of another reaction whereby titanium and titanium tetrachloride may react to form titanium dichloride as follows:

|  | Temperature °K. | Calculated ΔF° kcal. |
|---|---|---|
| $2TiCl_2 \rightleftharpoons Ti + TiCl_4$ | 500 | +24.8 |
|  | 1,000 | +13.7 |

A series of tests has shown that this reaction does not take place in a counter. W. Klemm and L. Grimm in an article in Z. Anorg. Allgem. Chem., Vol. 249, pp. 198–205 (1942), state that the lower chlorides of titanium by the reaction of titanium tetrachloride ($TiCl_4$) were produced by heating the mixture of titanium (Ti) powder and $TiCl_4$ to a temperature of 800–900° C. for 24 hours. This of course is a much higher temperature than encountered in counter operation. S. Ramamurthy in an article in the Transactions of the Indian Institute of Metals, Vol. 6, pp. 274–278 (1952), states that $TiCl_4$ is stable up to 2000° K. or 1727° C. This precludes any such reaction as the above in a Geiger counter. Reactions with other metals would require similar or greater temperatures. In the case of the possible reaction between $TiCl_2$ and $TiCl_4$ to form the trichloride the stability is indicated by the following reaction equation:

|  | Temperature °K. | Calculated ΔF° kcal. |
|---|---|---|
| $2TiCl_3 \rightleftharpoons TiCl_2 + TiCl_4$ | 500 | 24.8 |
|  | 1,000 | 2.7 |

Again the temperature required for the reaction is higher than ever encountered in counter operation. It is possible that by long continuous discharge through a counter the unstable compound of monochloride of titanium may be formed. However, in actual tests after 26 hours of a heavy continuous discharge with the filaments running red hot, a condition not experienced in practical use, all of the several counters undergoing tests were found not to change their characteristics.

Figure 3:
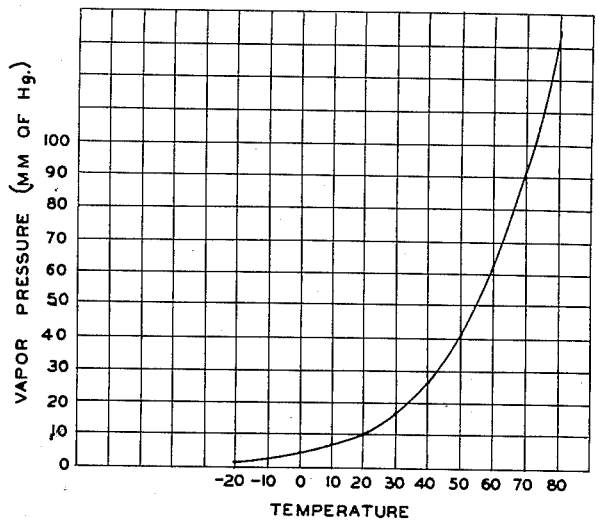
FIG. 3 is a graph showing the vapor pressure of titanium tetrachloride at various temperatures.

FIG. 3 shows graphically partial pressures of titanium tetrachloride for various temperatures. Titanium tetrachloride is a liquid at room temperature and atmospheric pressure. However, as seen in FIG. 3, the liquid is highly volatile and provides a substantial vapor pressure. Even if the counter is to be used below zero degrees centigrade, the pressure of the titanium tetrachloride at a few millimeters of mercury remains sufficient to function as the quenching agent.

Figure 4:
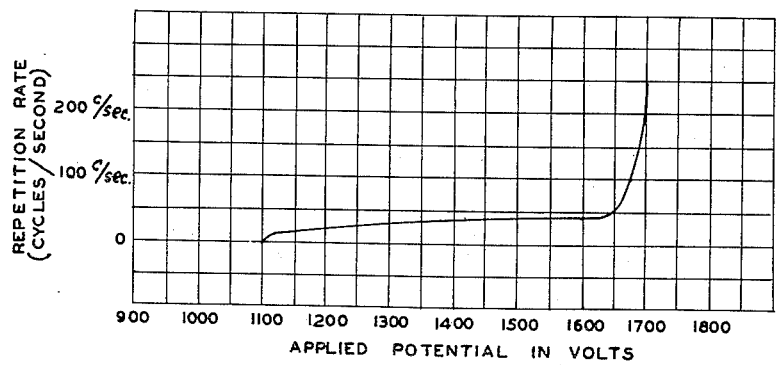
FIG. 4 is a graph showing counting rate at specific voltages in a tube employing titanium tetrachloride.

FIG. 4 is a graph of a typical counting rate characteristic for a tube employing titanium tetrachloride as a quenching agent. This characteristic is that of a Geiger counter employing a tubular titanium cathode ½ inch in diameter and a 5 mil-platinum-iridium wire anode in an atmosphere of 93 mm. of mercury pressure of neon and 7 mm. of mercury pressure of titanium tetrachloride. The platinum-iridium wire was used because there is no reaction with the titanium tetrachloride ($TiCl_4$) and this wire is readily sealed in the glass.

In addition to its other advantages as a quenching agent, titanium tetrachloride has been found to lend itself to obtaining identical characteristics in tubes as they are produced. This is of great advantage where it is important to make a plurality of counters all having the same characteristics. Although it is not clearly understood, it is known in the art that obtaining counters of the same characteristics, or being able to dpulicate consistently characteristics of counters in another counter heretofore has been practically impossible. Consequently, the difficult practice of making many counters and then grading them, mating counters having like characteristics. Using titanium tetrachloride, it is possible to manufacture counters having characteristics more nearly identical than ordinarily obtained by the prior art matching process. Furthermore, the stability of the titanium tetrachloride counters will be much improved so that counters that match in characteristics upon manufacture will still match after months or even years.

Summarizing the advantages of titanium tetrachloride in a counter, it will first be seen that the use of titanium tetrachloride provides stability as a quenching agent, that it is not used up as in the case of alcohol vapor and that it does not like chlorine readily reach with the metallic electrodes. It also saves expense in that pure metal electrodes can be used without expensive coating. Furthermore, titanium tetrachloride makes it possible to obtain counters having essentially identical characteristics which has not been possible in the past.

In addition to the possibility of introducing titanium tetrachloride as such, it is possible to introduce pure chlorine or a mixture of chlorine and titanium tetrachloride and by heating a tube structure containing the chlorine and a titanium electrode to sufficiently high temperature to cause sufficient chemical reaction between the titanium and the chlorine to form titanium tetrachloride.

Modifications and deviations from the structure shown in this disclosure, which will occur to those skilled in the art, are intended to be within the scope and spirit of the claims.

I claim:

1. A gaseous electron tube comprising an envelope, a pair of spaced electrodes having surfaces within the envelope, the cathode being composed of a material which will not react with titanium tetrachloride, and a gaseous material within the envelope including an inert gas and titanium tetrachloride, which serves as a quenching agent.

2. The gaseous electron tube of claim 1 in which the cathode is composed of titanium metal.

3. The gaseous electron tube of claim 1 in which the cathode is composed of titanium oxide.

References Cited in the file of this patent
UNITED STATES PATENTS

| | | |
|---|---|---|
| 2,612,615 | Fehr | Sept. 30, 1952 |
| 2,714,680 | Warmoltz | Aug. 2, 1955 |
| 2,899,582 | Hermsen et al. | Aug. 11, 1959 |